United States Patent [19]

Morningstar et al.

[11] Patent Number: 5,523,983
[45] Date of Patent: Jun. 4, 1996

[54] DUAL ROPE VIBRATION ISOLATION MODULE FOR TOWED HYDROPHONE STREAMER

[75] Inventors: Charles L. Morningstar, deceased, late of Lewisville, by Kelly L. Morningstar, executor; Tracy G. Gill, The Colony, both of Tex.

[73] Assignee: Whitehall Corporation, Dallas, Tex.

[21] Appl. No.: 342,306

[22] Filed: Nov. 18, 1994

Related U.S. Application Data

[63] Continuation-in-part of Ser. No. 126,305, Sep. 23, 1993, Pat. No. 5,367,499.

[51] Int. Cl.⁶ .............................. G01V 1/38; B63B 21/00
[52] U.S. Cl. ........................ 367/154; 367/20; 174/101.5
[58] Field of Search ........................... 367/20, 153, 154; 174/101.5, 42; 114/242, 247, 253

[56] References Cited

U.S. PATENT DOCUMENTS

| | | | |
|---|---|---|---|
| 2,614,143 | 10/1952 | Williams | 327/171 |
| 2,708,742 | 5/1955 | Harris | 340/7 |
| 2,782,059 | 2/1957 | Stranberg | 285/247 |
| 2,900,536 | 8/1959 | Palo | 310/9.6 |
| 3,177,016 | 4/1965 | Holmgren | 285/247 |
| 3,258,739 | 6/1966 | Hurley | 340/10 |
| 3,333,236 | 7/1967 | Schloss | 340/8 |
| 3,418,624 | 12/1968 | Massa | 340/9 |
| 3,739,326 | 6/1973 | Kerr et al. | 340/7 |
| 3,764,848 | 10/1973 | Berlincourt | 315/55 |
| 3,996,553 | 12/1976 | Siems et al. | 340/15 |
| 4,012,649 | 3/1977 | Cook et al. | 310/8.3 |
| 4,090,168 | 5/1978 | Miller et al. | 367/20 |
| 4,092,629 | 5/1978 | Siems et al. | 340/15 |
| 4,160,229 | 7/1979 | McGough | 340/7 |
| 4,204,188 | 5/1980 | Weichart et al. | 367/154 |
| 4,437,689 | 3/1984 | Goebel et al. | 285/246 |
| 4,491,939 | 1/1985 | Carpenter | 367/20 |
| 4,733,379 | 3/1988 | Lapetina et al. | 367/20 |
| 4,736,969 | 4/1988 | Fouts | 285/247 |
| 4,782,470 | 11/1988 | Poturnicki et al. | 367/157 |
| 4,787,069 | 11/1988 | Beauducel et al. | 367/21 |
| 4,819,216 | 4/1989 | Fraioli | 367/154 |
| 4,901,287 | 2/1990 | Hathaway et al. | 367/3 |
| 4,951,265 | 8/1990 | Buckles | 367/18 |
| 5,008,581 | 4/1991 | Kumada et al. | 310/323 |
| 5,367,499 | 11/1994 | Morningstar et al. | 367/154 |
| 5,388,926 | 2/1995 | Stottlemeyer | 403/294 |

FOREIGN PATENT DOCUMENTS

| 2137750 | 10/1984 | United Kingdom . |
|---|---|---|
| 2145226 | 3/1985 | United Kingdom . |

OTHER PUBLICATIONS

Proffitt, Jack M. "A History of Innovation in Marine Seismic Data Acquisition", *Geophysics: The Leading Edge of Exploration*, p. 24 (Mar. 1991).

Primary Examiner—Ian J. Lobo
Attorney, Agent, or Firm—Hitt Chwang & Gaines

[57] ABSTRACT

Disclosed is a vibration isolation module for a towed hydrophone streamer comprising: (1) a first transition unit, an outboard end of the first transition unit capable of receiving a first tension member, the first tension member terminating within the first transition unit, an inboard end of the first transition unit capable of receiving second and third tension members, the second tension member entering, looping back and exiting the inboard end of the first transition unit, the third tension member terminating within the first transition unit and (2) a second transition unit, an outboard end of the second transition unit capable of receiving a fourth tension member, the fourth tension member terminating within the second transition unit, an inboard end of the second transition unit capable of receiving the second and third tension members, the second tension member entering, looping back and exiting the inboard end of the second transition unit, the third tension member terminating within the second transition unit.

33 Claims, 3 Drawing Sheets

DUAL ROPE VIBRATION ISOLATION MODULE FOR TOWED HYDROPHONE STREAMER

CROSS REFERENCE TO RELATED APPLICATION

This is a continuation-in-part of U.S. Pat. No. 5,367,499, filed on Sep. 23, 1993, entitled "Vibration Isolation Module for Towed Hydrophone Streamer," commonly assigned with the present invention and incorporated herein by reference.

TECHNICAL FIELD OF THE INVENTION

The present invention is directed, in general, to towed hydrophone streamers and, more specifically, to a compact vibration isolation module designed to damp vibration that may distort telemetry signals produced by the hydrophones.

BACKGROUND OF THE INVENTION

It is now common practice to explore the oceans of the earth for deposits of oil, gas and other valuable minerals by seismic techniques in which a seismic exploration vessel imparts an acoustic wave into the water, typically by use of a compressed air "gun". The acoustic wave travels downwardly into the sea bed and is reflected at the interfaces between layers of materials having varying acoustic impedances. The wave travels back upwardly where it is detected by microphone or "hydrophone" elements in a streamer or array towed by the vessel to yield information regarding characteristics of the underwater material and structures.

A towed acoustic array typically comprises a plurality of pressure-sensitive hydrophone elements enclosed within a waterproof sheath or jacket and electrically coupled to recording equipment onboard the vessel. Each hydrophone element within the towed array is designed to convert the mechanical energy present in pressure variations surrounding the hydrophone element into electrical signals. Most typically, this is done by constructing the hydrophone of a piezoelectric material, such as lead zirconate titanate ("PZT") and a means by which to amplify pressure variations to obtain the strongest possible signal (often by one or more diaphragms acting as tympanic collectors). The hydrophone elements are typically provided with leads or contacts to which to join electrical conductors, the electrical conductors carrying signals from the hydrophone elements to the recording equipment.

A typical towed array is taught in U.S. Pat. No. 4,160,229, that issued on Jul. 3, 1979, directed to a hydrophone streamer apparatus embodying concentric tube construction for achieving improved low noise operation. A plurality of hydrophone elements are supported within a compliant inner tube at spaced intervals therealong by rather complicated compliant mounting means. The inner tube is supported within an elongated outer jacket by compliant support means between the outer surface of the inner tube and the inner surface of the jacket. Suitable support means may comprise a plurality of trilobate devices each formed of three tubular sections equally spaced around the inner tube, the trilobate devices being located along the inner tube at positions between adjacent transducer elements.

The signals that hydrophones produce are of extremely low level. This is because the pressure signals that impinge on the hydrophones are weak, the hydrophones themselves are high impedance devices and the volume of piezoelectric material in hydrophones is minimized for cost reasons. Thus, it is very important to limit unwanted noise to preserve the faint signals.

Unfortunately, during operation, hydrophones encounter acoustic noise produced by a wide variety of sources emanating from the surrounding ocean, such as surface ocean waves striking the streamer or its towing vessel, propeller noise or swell noise from the towing vessel or even volcanos. Moreover, the towing cables leading from the vessel may strum as they are dragged through the water. The noise these sources produce lies mostly in the range below 10 Hz, increasing dramatically as the frequency approaches 0 Hz. The valid acoustic signals reflected back from the ocean floor tend to lie in a range from a few Hz to several hundred Hz.

In an effort to make the most use of available bandwidth of the data buses and to improve the hydrophone signal to noise ratio, it therefore becomes highly advantageous to filter out the noise. This frees the buses of the burden of carrying data pertaining to the noise, allowing that bandwidth to be spent instead on a higher resolution of the data pertaining to the remaining higher frequencies.

One of the ways to provide such filtering is to isolate the streamer from the towing vessel. Any structure-borne noise that the towing vessel generates (by its propeller or swell) is thus attenuated before it reaches the streamer. This isolation has been done by inserting a vibration isolation module ("VIM") at a forward end of the streamer (and also at the aft end, if a terminating buoy or rope drogue is used).

The most basic type of VIM is a loss-type and employs one or more elastic ropes, acting as low-pass filters. The ropes allow constant towing forces to be transmitted to the streamer, while intermittent-energy vibrations are attenuated therein, dissipated as thermal energy in the ropes. Another type of VIM is a stop-band type and employs structures having different vibration propagation velocities and interfaces that create reflections, causing superpositions at selected frequencies that damp those frequencies. Stop-band VIMs are relatively expensive and are limited in their ability to provide broadband filtering. Thus, for most applications, loss-type VIMs are preferred.

The earliest loss-type VIM employed a single length of lossy rope (a "primary rope") to attenuate vibration. The lossy rope was either of a natural fiber in the earliest embodiments or a manmade elastomer or polymer in more recent embodiments. While this was suitable for the purpose of attenuating vibration, towing force transients (such as those resulting as the towing vessel pitches in rough seas) occasionally caused the single lossy rope to stretch past the point at which it can return to its original length and flexibility. Over time, this altered the lossy rope's damping characteristics, decreasing the effectiveness of the VIM.

One step toward solving this problem was to add a second lossy rope (a "secondary rope") that only came into play when the towing force exceeded a first limit. The secondary rope introduced more resistance to stretching and, hence, changed the response of the VIM to vibration. Unfortunately, extreme towing force transients still distended both the primary and secondary ropes, forever changing their ability to filter out vibrations.

The next step toward solving this problem has been to provide a third rope (a "stopper rope") in the VIM. However, this stopper rope differs from the primary and secondary ropes in that the stopper rope is extremely strong and relatively inextensible. The function of the stopper rope is to carry towing force transients that would otherwise distend the primary and secondary ropes. Because the stopper rope is relatively inextensible, it is not lossy and vibrations pass through to the subsequent modules. However, the stopper rope is not designed to carry forces under normal operation of the streamer. The stopper rope is provided on the theory that it is better to vibrate the streamer for a short time rather than to cause long-term harm to the primary rope.

These three-rope lossy VIMs have been implemented in deepwater streamers having a diameter of at least 2.8 inches by providing three rope loops, pulleys at either end of the VIM receiving the rope loops and transferring towing forces and vibration into the rope loops as desired. Since the pulleys acted to transition energy into the ropes, they are called "transitions." The pulleys were of a conventional side-by-side design, existing as a block.

As mentioned, deepwater seismic streamers have had a diameter of at least 2.8 inches, although some small streamers of limited capability and employed for specialized work have been of less diameter. This large diameter was necessary to house larger, stronger strain cables and larger diameter hydrophones. This larger diameter posed a storage problem, as such streamers are typically more than 3 km long. The sheer volume of the streamer and handling equipment exacerbated the modern practice of towing multiple streamers in an array. Further, as damaged modules must be shipped to repair sites, the larger diameter posed a shipping problem.

It thus became very advantageous to provide a thinner streamer (of only 2 inches in diameter, for example). Unfortunately, the prior art scheme employing side-by-side pulleys in a three-rope VIM cannot be reduced to the desired 2 inch maximum diameter. Ser. No. 08/126,305 discloses a three-rope lossy VIM having narrow, more volume-efficient transitions therein, thereby allowing the VIM to be 2 inches in diameter.

Since that time, it has been discovered that the secondary rope is not necessary in some applications. In such applications, the vibration damping qualities of the primary rope are sufficient during normal operating conditions. When tension on the VIM exceeds the predetermined first limit, a stopper rope can be employed to prevent the primary rope from being stretched beyond its ability to recover. Furthermore, a rope composed of liquid crystal polymer fibers and having an ability to accept extremely high tension (5000 pounds with a 0.161 inch rope) has become commercially available from, for example, Yale Cordage, Inc. of Portland, Me. Such liquid crystal polymer fiber ropes can be significantly smaller in diameter than Kevlar ropes of corresponding strength and have flexibility and wear characteristics that are superior to previous Kevlar stopper ropes. Such liquid crystal polymer fiber ropes may also replace steel cables found in prior art VIMs.

What is therefore needed in the art is a two-rope lossy VIM having even more narrow, more volume-efficient transitions therein and that takes advantage of new, commercially-available stopper rope materials.

SUMMARY OF THE INVENTION

To address the above-discussed deficiencies of the prior art, it is a primary object of the present invention to provide a VIM having a single, vibration-damping rope and a stopper rope, the entire VIM fitting within a 2 inch diameter jacket. The module should also provide a central space for an electrical bus to pass therethrough, the streamer requiring the bus to transmit telemetry data from the hydrophones in the streamer to the towing vessel. Transitions in the VIM should make provision for use of liquid crystal polymer fiber ropes and should also provide a central space for the electrical bus to pass therethrough.

In the attainment of the primary object, the present invention provides a VIM for a towed hydrophone streamer, comprising: (1) a first transition unit, an outboard end of the first transition unit capable of receiving a first tension member, the first tension member terminating within the first transition unit, an inboard end of the first transition unit capable of receiving second and third tension members, the second tension member entering, looping back and exiting the inboard end of the first transition unit, the third tension member terminating within the first transition unit and (2) a second transition unit, an outboard end of the second transition unit capable of receiving a fourth tension member, the fourth tension member terminating within the second transition unit, an inboard end of the second transition unit capable of receiving the second and third tension members, the second tension member entering, looping back and exiting the inboard end of the second transition unit, the third tension member terminating within the second transition unit.

The units transition towing forces (including vibration) between the tension members and the units in the module. The generic term "tension member" is defined to include both cables and ropes, whether they be extensible or inextensible. It is an object of the present invention to damp vibration in the second tension member. Therefore, in a preferred embodiment, the first, third and fourth tension members are relatively inextensible liquid crystal polymer fiber rope, while the second tension member comprises relatively extensible rope, such as Nylon rope. The second tension member preferably has a preselected modulus of elasticity or may be cut to a preselected length to provide the necessary damping characteristics.

In a preferred embodiment of the present invention, the VIM has two transition units. Each transition unit comprises: (1) a primary block with a substantially cylindrical cross-section and a primary block eye channel located therein, the primary block eye channel having an entry channel, an exit channel and a crossover channel coupling the entry and exit channels, the primary block eye channel entry, exit and crossover channels cooperating to form a pathway for a first tension member to terminate with an eye in the primary block and (2) a secondary block with a substantially cylindrical cross-section and a secondary block eye channel located therein, the secondary block eye channel having an entry channel, an exit channel and a crossover channel coupling the entry and exit channels, the secondary block eye channel entry, exit and crossover channels cooperating to form a pathway for a third tension member to terminate with an eye in the primary block, the secondary block further having a loopback channel having an entry channel, and exit channel and a crossover channel coupling the entry and exit channels, the loopback channel entry, exit and crossover channels cooperating to form a pathway for a second tension member to loop back within the secondary block. Thus, as can be seen, the transition units are interchangeable and employ the same interchangeable parts.

In a preferred embodiment of the present invention, the loopback channel is larger in diameter than the primary and secondary block eye channels. This accounts for the difference in diametral size between the Nylon rope of the second tension member and the liquid crystal polymer rope of the first, third and fourth tension members.

In a preferred embodiment of the present invention, the primary and secondary block eye channel entry and exit channels include means for reducing tension on the eyes of the first and third tension members. In the embodiment to be illustrated, the entry and exit channels are widened (by removing portions of the primary and secondary blocks) to allow the first and third tension members to assume a more natural profile, thereby reducing stress. In an alternative embodiment, the entry and exit channels may be aparallel. "Aparallel," for purposes of the present discussion, means not-quite-parallel or out-of-parallel. In the embodiment to be illustrated, the entry and exit channels are angled slightly toward one another at the outside ends of each transition unit. This is to accommodate the natural profile of the eye formed in the first, third and fourth tension members. To the extent that the entry and exit channels conform to the natural profile, tension in the eyes is reduced. In yet another alternative embodiment, pins may be placed in the primary and secondary blocks around which the eyes travel.

In a preferred embodiment of the present invention, the primary and secondary blocks of the first and second transition units are held in a fixed relative relationship by an annular housing that surrounds the primary and secondary blocks. The housing and primary and secondary blocks are preferably composed of titanium. A retaining ring preferably holds the primary and secondary blocks within the housing. The retaining ring may be a conventional snap ring fitting within a groove formed in an inner surface of the housing.

As previously described, a hydrophone streamer is surrounded by water during operation. The VIM is no exception. Thus, to preserve the integrity of the VIM of the present invention, a waterproof jacket surrounds the units and the tension members to prevent seawater from harming those components. Furthermore, in the illustrated embodiment, a fill fluid is introduced into the jacket and surrounds the units and tension members to give the module a near-neutral buoyancy with respect to seawater and to slow the invasion of seawater should it occur. To this end, in a preferred embodiment of the present invention, each transition unit comprises a fluid port in the primary block for allowing fluid flow into and out of the transition unit. Therefore, the fill fluid is allowed to occupy an interior of each transition unit.

Finally, since hydrophone streamers are electrical devices and are linked to the towing vessel or seismic exploration vehicle, the VIM should accommodate an electrical bus therethrough. Accordingly, in a preferred embodiment, each transition unit has a radially central bore to accept an electrical bus through the unit.

The foregoing has outlined rather broadly the features and technical advantages of the present invention so that the detailed description of the invention that follows may be better understood. Additional features and advantages of the invention will be described hereinafter that form the subject of the claims of the invention. Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
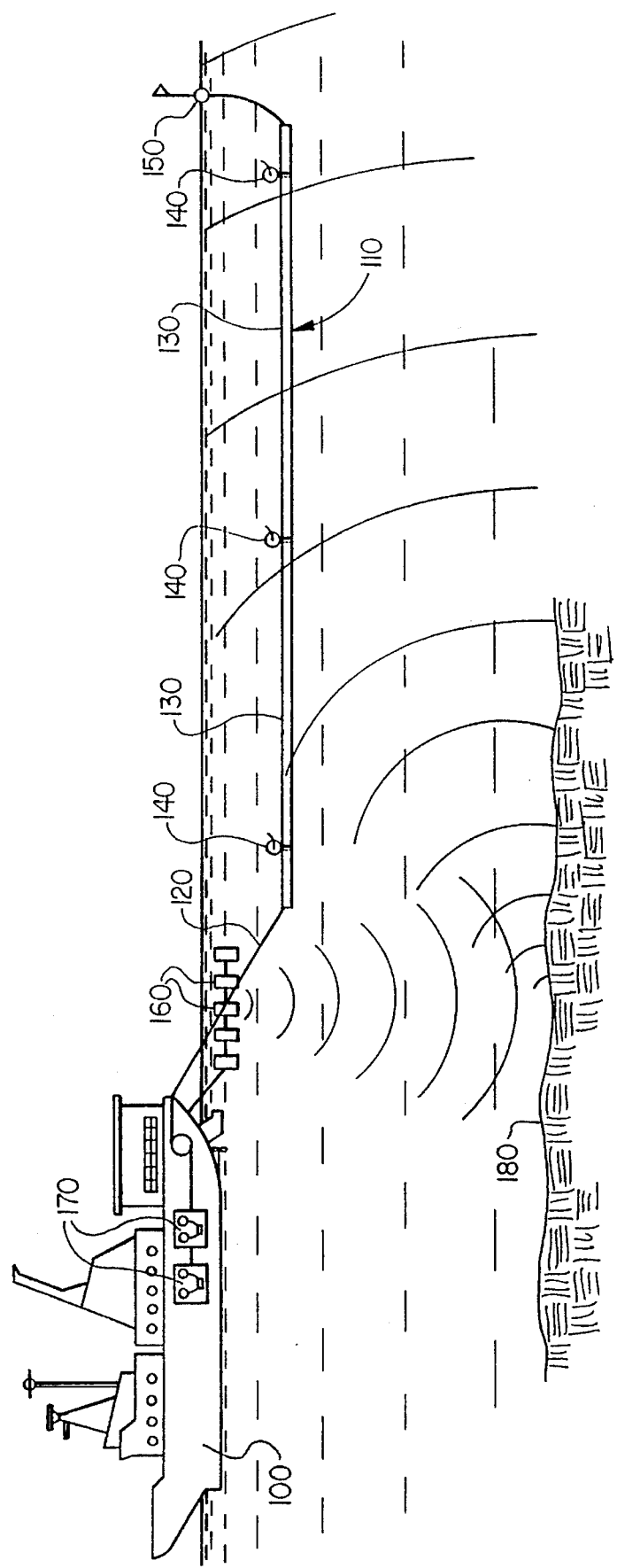
FIG. 1 illustrates an elevational view representing a towed array in operation.

Referring initially to FIG. 1, illustrated is an elevational view representing a towed array in operation. A seismic exploration vehicle 100 tows a streamer 110 behind it by way of a tow cable 120. The streamer 110 may comprise a rear buoy 150 if necessary. The streamer 110 is additionally provided with one or more leveling devices or "birds" 140 that serve to regulate the depth of the streamer 110 within the water. The seismic exploration vehicle 100 also tows compressed air guns 160 or other sources of acoustic energy that generate an acoustic wave in the water that travels downwardly as shown, reflects at interfaces within the sea bed 180 and is detected by the hydrophones of the streamer 110. The analog signals generated by the hydrophones within the streamer 110 upon receipt of the reflected wave are converted to digital format by analog-to-digital converters also comprised in the streamer 110 and are transmitted in digital form along the streamer 110 and up the tow cable 120 to be recorded by digital recording devices 170 on board the ship 100. The streamer 110 comprises a plurality of modules 130. Each module 130 comprises a plurality of hydrophone assemblies (individually referenced in FIG. 2). The modules 130 are connectible to each other in various numbers to make the streamer 110 any length desired, up to a practical maximum length. The frontmost and aftmost modules are preferably VIMs not containing hydrophones. As previously described, the purpose of the VIMs is to isolate the non-VIM modules from acoustic noise generated when the modules are placed in water and towed.

Figure 2:
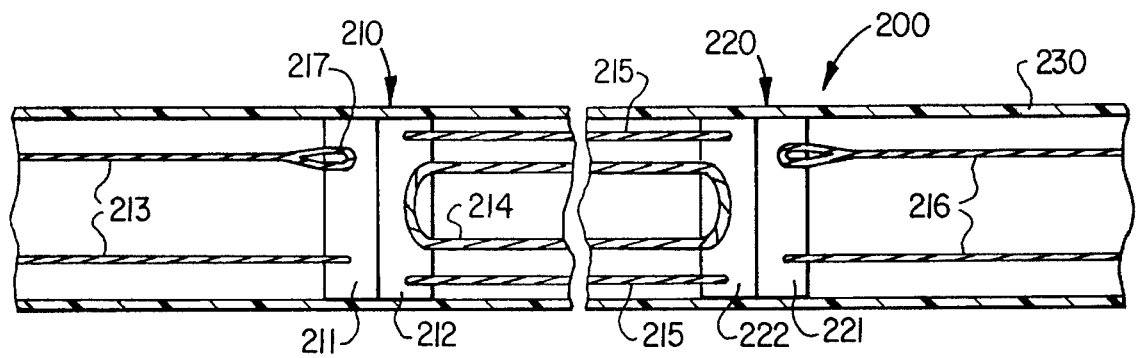
FIG. 2 illustrates a schematic diagram of the VIM of the present invention.

Turning now to FIG. 2, illustrated is a schematic diagram of the VIM of the present invention. The VIM, generally designated 200, comprises a first transition unit 210 and a second transition unit 220. Each transition unit 210, 220 effects a transition of towing forces and vibration from one set of tension members to another and is implemented as a two-block set, schematically represented by separation of the units by vertical lines into two blocks each.

The first transition unit 210 comprises a primary block 211 and a secondary block 212. The primary block 211 is capable of receiving a plurality of first tension members 213 into axial channels in the primary block 211 (not shown in FIG. 2). The plurality of first tension members 213 terminate in the primary block 211 as shown. Since FIG. 2 is highly schematic, termination of the plurality of first tension members 213 is represented by a loop (e.g. 217). This loop represents an eye formed in an end of each of the plurality of first tension members 213 in a conventional eye-splicing process.

The secondary block 212 is capable of receiving a second tension member 214 and a plurality of third tension members 215. The second tension member 214 is preferably a relatively extensible rope. The plurality of third tension members 215 comprise a relatively inextensible rope, preferably composed of liquid crystal polymer fibers. The secondary block 212 is designed to loop back the second tension member 214, allowing it to return from whence it came. In this manner, the second tension member 214 can be formed in a loop stretching between the secondary blocks of the first and second transition units 210, 220. The second tension member 214 is preferably butt-spliced in a conventional manner to achieve the required loop. The secondary block 212 is further designed to receive and terminate the plurality of third tension members 215. Preferably, the plurality of third tension members 215 terminate in an eye, as do the plurality of first tension members 213. Therefore, the termination of the plurality of third tension members 215 in the secondary block 212 is represented by a loop (analogous to the loop 217). In the illustrated embodiment, the second tension member 214 acts as a primary rope, stretching to attenuate vibrations as they occur. The plurality of third tension members 215 act jointly as a stopper rope, limiting the amount of stretch that the second tension member is forced to endure. In this manner, if the towing force of the seismic exploration vehicle 100 of FIG. 1 exceeds a predesignated first limit, the second tension member 214 stretches to a maximum length, at which point the stopper rope becomes taut, absorbing any additional towing forces.

The second transition unit 220 also comprises a primary block 221 and a secondary block 222. The secondary block 222 accepts the second and plurality of third tension members 214, 215, looping back the second tension member 214 and terminating the plurality of third tension members 215 (with eye splices) in the secondary block 222. The primary block 221 receives a plurality of fourth tension member 216 into axial channels in the primary block 221 (again, not shown in FIG. 2). The plurality of fourth tension members 216 terminate in the primary block 211 with loops as shown.

The first and second transition units 210, 220 are of the same construction and function, as the VIM 200 is symmetrical about its centerline. Since FIG. 2 is highly schematic, housings holding the primary and secondary blocks 211, 221, 212, 222 of the first and second transition units 210, 220 are not shown. These housings prevent the primary and secondary blocks 211, 221, 212, 222 from separating under the towing force. The other ends of the plurality of first and fourth tension members 213, 216 are connected to conventional couplers (not shown) that allow the VIM 200 to be releasably coupled to other modules 130 in the streamer.

As previously described, a hydrophone streamer is surrounded by water during operation. The VIM 200 is no exception. Thus, to preserve the integrity of the VIM 200 of the present invention, a waterproof jacket 230 surrounds the units 210, 220 and the tension members 213, 214, 215, 216 to prevent seawater from harming those components. Furthermore, in the illustrated embodiment, a fill fluid is introduced into the jacket 230 and surrounds the first and second transition units 210, 220 and tension members 213, 214, 215, 216 to give the VIM 200 a near-neutral buoyancy with respect to seawater and to slow the invasion of seawater, should it occur.

Figure 3:
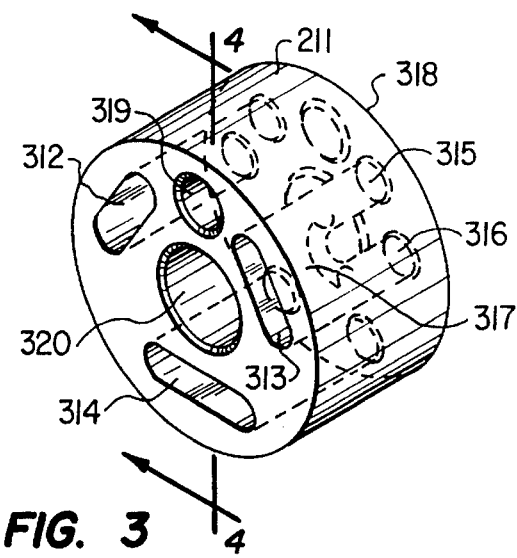
FIG. 3 illustrates an isometric view of a primary block of one of the transition units of FIG. 2.

Turning now to FIG. 3, illustrated is an isometric view of a primary block of one of the transition units of FIG. 2 (for instance, the first transition unit 210) of the present invention. The primary block 211 has a substantially cylindrical cross-section and a plurality of (in the illustrated embodiment, three) primary block eye channels 312, 313, 314 located therein and spaced regularly (at 120°) about the circumference of the primary block 211. Each primary block eye channel has an entry channel, an exit channel and a crossover channel (only one of each of which referenced as 315, 316, 317, respectively). The crossover channels 317 couple the entry and exit channels 315, 316. The primary block eye channel entry, exit and crossover channels 315, 316, 317 cooperate to form a pathway for the plurality of first tension members 213 of FIG. 1 to terminate with an eye in the primary block, in a manner to be shown in conjunction with FIG. 7.

In the illustrated embodiment, the primary block eye channel entry and exit channels 315, 316 are widened (by removing portions of the primary and secondary blocks 211, 221, 212, 222, as shown) to allow the eyes of the plurality of first tension members 213 (and the plurality of fourth tension members 216, when the primary block is employed as the primary block 221 of the second transition unit 220) to assume a more natural profile, thereby reducing stress. Alternatively, the entry and exit channels 315, 316 may be angled slightly toward one another at an outside end 318 of the primary block (the end of the block that is located at the outside end of each transition unit 210, 220). This is to accommodate the natural profile of the eye formed in the plurality of first and fourth tension members 213, 216. To the extent that the entry and exit channels 315, 316 conform to the natural profile, tension in the eyes is reduced. Those of skill in the art will recognize the need for such accommodation.

The primary block 211 further comprises a fluid port 319 for allowing fluid flow into and out of the transition unit. As previously mentioned, a fill fluid occupies the interior of the jacket 230 to attain neutral buoyancy for the VIM 200. The fill fluid is allowed to occupy an interior of each transition unit 210, 220 via the fluid port 319. The primary block 211 further includes a central bore 320 adapted to allow passage of an electrical bus (not shown) through the primary block 211.

Finally, as is apparent in FIG. 3, sharp edges and corners are radiused to prevent the primary block 211 from cutting into the plurality of first and fourth tension members 213, 216.

Figure 4:
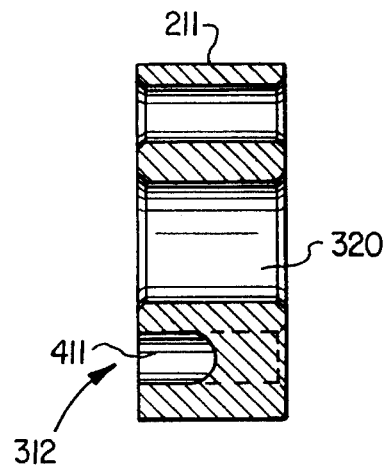
FIG. 4 illustrates a sectional view of the primary block of FIG. 3 taken along lines 4—4.

Turning now to FIG. 4, illustrated is a sectional view of the primary block of FIG. 3 taken along lines 4—4. FIG. 4 is presented primarily for the purpose of showing the configuration of the eye channel 312. Specifically, shown is one crossover channel 411 linking adjoining entry and exit channels (not referenced). Also shown is the central bore 320.

Figure 5:
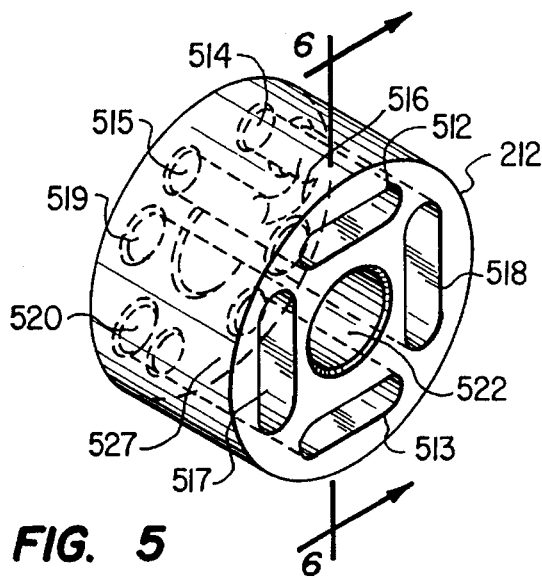
FIG. 5 illustrates an isometric view of a secondary block of one of the transition units of FIG. 2.

Turning now to FIG. 5, illustrated is an isometric view of a secondary block of one of the transition units of FIG. 2 (for instance, the first transition unit 210) of the present invention. The secondary block 212 has a substantially cylindrical cross-section and a plurality of (in the illustrated embodiment, two) secondary block eye channels 512, 513 located therein and spaced regularly (at 180°) about the circumference of the secondary block 212. Each secondary block eye channel 512, 513 has an entry channel, an exit channel and a crossover channel (only one of each of which referenced as 514, 515, 516, respectively). The crossover channels 516 couple the entry and exit channels 514, 515. The secondary block eye channel entry, exit and crossover channels 514, 515, 516 cooperate to form a pathway for the plurality of third tension members 215 of FIG. 1 to terminate with an eye in the secondary block 212, in a manner to be shown in conjunction with FIG. 7.

The secondary block 212 further has a plurality of (in the illustrated embodiment, two) secondary block loopback channels 517, 518 located therein and spaced regularly (at 180° and offset 90° with respect to the eye channels 512, 513) about the circumference of the secondary block 212. Each loopback channel 517, 518 has an entry channel, and exit channel and a crossover channel (only one of each of which referenced as 519, 520, 521, respectively). The crossover channel couples the entry and exit channels 519, 520. The loopback channel entry, exit and crossover channels 519, 520, 521 cooperate to form a pathway for the second tension member 214 to loop back within the secondary block 212.

In the illustrated embodiment, the plurality of loopback channels 516, 517 are larger in diameter than the primary and secondary block eye channels 312, 313, 314, 512, 513. This accounts for the difference in diametral size between the Nylon rope (preferably 5/16 inch) of the second tension member 214 and the liquid crystal polymer rope (preferably 0.161 inch) of the plurality of first, third and fourth tension members 213, 215, 216.

The secondary block 212 further includes a central bore 522 adapted to allow passage of an electrical bus (not shown) through the secondary block 212. Finally, as is apparent in FIG. 5, sharp edges and corners are radiused to prevent the secondary block 212 from cutting into the second tension member 214 or the plurality of third tension members 215.

Figure 6:
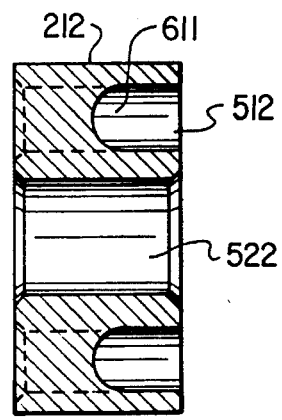
FIG. 6 illustrates a sectional view of the secondary block of FIG. 5 taken along lines 6—6.

Turning now to FIG. 6, illustrated is a sectional view of the secondary block of FIG. 5 taken along lines 6—6. FIG. 6 is presented primarily for the purpose of showing the configuration of the eye channel 512. Specifically, shown is one crossover channel 611 linking adjoining entry and exit channels (not referenced). Also shown is the central bore 521.

Figure 7:
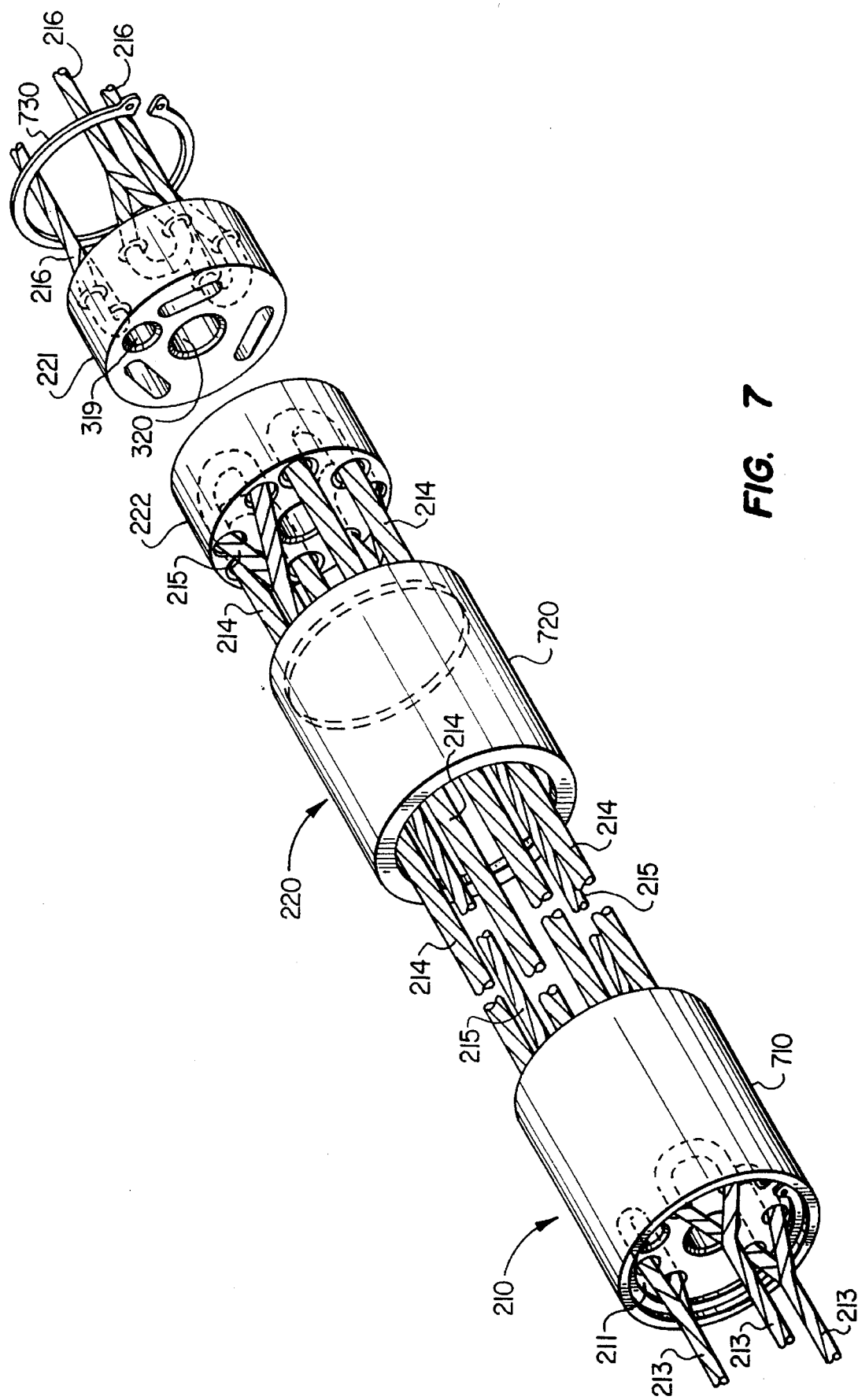
FIG. 7 illustrates an isometric view of the VIM of FIG. 2, including an as-assembled view of the first transition block and an exploded view of the second transition block.

Turning now to FIG. 7, illustrated is an isometric view of the VIM of FIG. 2, including an as-assembled view of the first transition block 210 and an exploded view of the second transition block 220. In addition to the elements previously called out and described, FIG. 7 shows annular housings 710, 720 that surround and hold the primary and secondary blocks 211, 221, 212, 222 of the first and second transition units 210, 220 in a fixed relative relationship. The housings 710, 720 and primary and secondary blocks 211, 221, 212, 222 are preferably composed of titanium. A retaining ring 730 (only one of which is shown) holds the primary and secondary blocks 211, 212, 221, 222 within the housings 710, 720. The retaining ring 730 may be placed on the inboard or outboard end of each of the housings 710, 720 and may be a conventional carbon spring steel snap ring fitting within a conventional groove formed in an inner surface of each of the housings 710, 720.

From the above, it is apparent that the present invention provides a VIM for a towed hydrophone streamer comprising: (1) a first transition unit, an outboard end of the first transition unit capable of receiving a first tension member, the first tension member terminating within the first transition unit, an inboard end of the first transition unit capable of receiving second and third tension members, the second tension member entering, looping back and exiting the inboard end of the first transition unit, the third tension member terminating within the first transition unit and (2) a second transition unit, an outboard end of the second transition unit capable of receiving a fourth tension member, the fourth tension member terminating within the second transition unit, an inboard end of the second transition unit capable of receiving the second and third tension members, the second tension member entering, looping back and exiting the inboard end of the second transition unit, the third tension member terminating within the second transition unit.

Although the present invention and its advantages have been described in detail, it should be understood that various changes, substitutions and alterations can be made herein without departing from the spirit and scope of the invention as defined by the appended claims.

What is claimed is:

1. A vibration isolation module for a towed hydrophone streamer, comprising:

a first transition unit, an outboard end of said first transition unit capable of receiving a first tension member, said first tension member terminating within said first transition unit, an inboard end of said first transition unit capable of receiving second and third tension members, said second tension member entering, looping back and exiting said inboard end of said first transition unit, said third tension member terminating within said first transition unit; and a second transition unit, an outboard end of said second transition unit capable of receiving a fourth tension member, said fourth tension member terminating within said second transition unit, an inboard end of said second transition unit capable of receiving said second and third tension members, said second tension member entering, looping back and exiting said inboard end of said second transition unit, said third tension member terminating within said second transition unit.

2. The module as recited in claim 1 wherein said first and second transition units each comprise an eye channel for allowing a selected one of said first, third and fourth tension members to terminate in an eye.

3. The module as recited in claim 1 wherein said first, third and fourth tension members are composed of relatively inextensible material selected from the group consisting of:

liquid crystal polymer fiber rope and metal cable.

4. The module as recited in claim 1 wherein said second tension member comprises relatively extensible rope.

5. The module as recited in claim 1 wherein said second tension member has a preselected modulus of elasticity.

6. The module as recited in claim 1 wherein said first and second transition units comprise a primary block with a substantially cylindrical cross-section and an eye channel located therein, said eye channel having an entry channel, an exit channel and a crossover channel coupling said entry and exit channels, said eye channel entry, exit and crossover channels cooperating to form a pathway for a selected one of said first and fourth tension members to terminate with an eye in said primary block.

7. The module as recited in claim 1 wherein said first and second transition units comprise a secondary block with a substantially cylindrical cross-section and an eye channel located therein, said eye channel having an entry channel, an exit channel and a crossover channel coupling said entry and exit channels, said eye channel entry, exit and crossover channels cooperating to form a pathway for said third tension member to terminate with an eye in said primary block, said secondary block further having a loopback channel having an entry channel, and exit channel and a crossover channel coupling said entry and exit channels, said loopback channel entry, exit and crossover channels cooperating to form a pathway for said second tension member to loop back within said secondary block.

8. The module as recited in claim 1 wherein said first and second transition units each comprise a plurality of blocks surrounded and held in a fixed relative relationship by a housing.

9. The module as recited in claim 1 wherein a waterproof jacket surrounds said units and said tension members.

10. The module as recited in claim 1 wherein said first and second transition units have a radially central bore to accept an electrical bus through said units.

11. A method of providing vibration isolation for a hydrophone streamer undergoing a towing force, comprising the steps of:

accepting said towing force and vibration into a first tension member coupled to an exploration vehicle;

transferring said towing force and said vibration into a first transition unit of a vibration isolation module;

damping said vibration in a second tension member extending in a loop between said first transition unit and a second transition unit;

transferring a portion of said towing force and said vibration into a third tension member extending between and terminating in eyes within said first and second transition units when said towing force exceeds a first limit;

transferring said towing force into a fourth tension member coupled to said second transition unit; and transferring said towing force to said hydrophone streamer coupled to said fourth tension member, said vibration having been damped when said towing force is within said first limit.

12. The method as recited in claim 11 further comprising the step of terminating a selected one of said first, third and fourth tension members in an eye within an eye channel in said first and second transition units.

13. The method as recited in claim 11 wherein said first, third and fourth tension members are composed of relatively inextensible material selected from the group consisting of:

liquid crystal polymer fiber rope and metal cable.

14. The method as recited in claim 11 wherein said second tension member comprises relatively extensible rope.

15. The method as recited in claim 11 wherein said second tension member has a preselected modulus of elasticity.

16. The method as recited in claim 11 further comprising the step of providing a primary block in said first and second transition units, said primary block having a substantially cylindrical cross-section and an eye channel located therein, said eye channel having an entry channel, an exit channel and a crossover channel coupling said entry and exit channels, said eye channel entry, exit and crossover channels cooperating to form a pathway for a selected one of said first and fourth tension members to terminate with an eye in said primary block.

17. The method as recited in claim 11 further comprising the step of providing a secondary block in said first and second transition units, said secondary block having a substantially cylindrical cross-section and an eye channel located therein, said eye channel having an entry channel, an exit channel and a crossover channel coupling said entry and exit channels, said eye channel entry, exit and crossover channels cooperating to form a pathway for said third tension member to terminate with an eye in said primary block, said secondary block further having a loopback channel having an entry channel, and exit channel and a crossover channel coupling said entry and exit channels, said loopback channel entry, exit and crossover channels cooperating to form a pathway for said second tension member to loop back within said secondary block.

18. The method as recited in claim 11 wherein said first and second transition units each comprise a plurality of blocks surrounded and held in a fixed relative relationship by a housing.

19. The method as recited in claim 11 wherein a waterproof jacket surrounds said units and said tension members.

20. The method as recited in claim 11 wherein said first and second transition units have a radially central bore to accept an electrical bus through said units.

21. A transition unit for a vibration isolation module, comprising:

a primary block with a substantially cylindrical cross-section and a primary block eye channel located therein, said primary block eye channel having an entry channel, an exit channel and a crossover channel coupling said entry and exit channels, said primary block eye channel entry, exit and crossover channels cooperating to form a pathway for a first tension member to terminate with an eye in said primary block; and a secondary block with a substantially cylindrical cross-section and a secondary block eye channel located therein, said secondary block eye channel having an entry channel, an exit channel and a crossover channel coupling said entry and exit channels, said secondary block eye channel entry, exit and crossover channels cooperating to form a pathway for a third tension member to terminate with an eye in said primary block, said secondary block further having a loopback channel having an entry channel, and exit channel and a crossover channel coupling said entry and exit channels, said loopback channel entry, exit and crossover channels cooperating to form a pathway for a second tension member to loop back within said secondary block.

22. The transition unit as recited in claim 21 wherein said primary and secondary block eye channel entry and exit channels include means for reducing tension on said eyes of said first and third tension members.

23. The transition unit as recited in claim 21 wherein said first and second transition units each have a central axial bore therethrough for accepting an electrical conductor through said first and second transition units.

24. The transition unit as recited in claim 21 further comprising a tension-bearing housing surrounding said primary and secondary blocks, said housing holding said primary and secondary blocks in a fixed relative relationship.

25. The transition unit as recited in claim 21 wherein said primary block has three primary block eye channels distributed regularly about a circumference of said primary.

26. The transition unit as recited in claim 21 wherein said secondary block has two radially-opposed secondary block eye channels and two radially-opposed loopback channels distributed regularly about a circumference of said secondary block.

27. The transition unit as recited in claim 21 wherein said first and third tension members are composed of relatively inextensible material selected from the group consisting of:

liquid crystal polymer fiber rope and metal cable.

28. The transition unit as recited in claim 21 wherein said second tension member comprises relatively extensible rope.

29. The transition unit as recited in claim 21 further comprising a fluid port in said primary block for allowing fluid flow into and out of said transition unit.

30. The transition unit as recited in claim 21 wherein said primary and secondary blocks are composed of titanium.

31. The transition unit as recited in claim 21 further comprising a housing about said primary and secondary blocks and a removable retaining ring holding said primary and secondary blocks within said housing.

32. The transition unit as recited in claim 21 wherein said loopback channel is larger in diameter than said primary and secondary block eye channels.

33. The transition unit as recited in claim 21 wherein said second tension member has a preselected modulus of elasticity.

* * * * *